United States Patent [19]

Arnold et al.

[11] 3,942,996

[45] Mar. 9, 1976

[54] RADIATION SENSITIVE RECORDING MATERIAL

[75] Inventors: Gunther Arnold, Ulm; Gabor Paal, Stuttgart; Alfred Wilhelm, Ulm, all of Germany; Kurt Halfar, Meinier-Ge, Switzerland; Hans Peter Vollmer, Ulm, Germany

[73] Assignee: AGFA-Gevaert Aktiengesellschaft, Leverkusen, Germany

[22] Filed: Dec. 26, 1973

[21] Appl. No.: 427,535

[30] Foreign Application Priority Data

Dec. 22, 1972 Germany ............................ 2262894

[52] U.S. Cl. ............ 106/176; 106/193 P; 260/30.2; 260/30.4 R

[51] Int. Cl.$^2$ ........................ C08K 5/15; C08L 1/08

[58] Field of Search ........... 260/240 D, 240 R, 30.2, 260/30.4; 106/17.6, 193

[56] References Cited

UNITED STATES PATENTS 3,832,350 8/1974 Maruyama et al. ............. 260/240 D

OTHER PUBLICATIONS

Organic Chem. 3rd, Henderson, et al.

*Primary Examiner*—Theodore Morris
*Attorney, Agent, or Firm*—Connolly and Hutz

[57] ABSTRACT

A radiation sensitive recording material contains a layer of a layer-forming substance and incorporated therein an organic halogen compound capable of producing hydrogenhalide when struck by high energy radiation, and a chromogenic arylvinyl pyran or arylvinylthio pyran which changes its color by reaction with hydrolide. The material provides records with high stability.

7 Claims, No Drawings

RADIATION SENSITIVE RECORDING MATERIAL

This invention relates to a radiation sensitive recording material the essential components of which are a chromogenic substance, an HX donor and a layer forming substance.

Radiation sensitive recording materials which contain photochromic or chromogenic substances as components which are capable of undergoing a color change are already known, in particular for the rapid recording of data by means of high energy radiation, particularly laser beams. Thus, for example, the recording material disclosed in German Auslegeschrift No. 1,274,655 contains a photochromic substance a spiropyran compound which in combination with a so-called HX donor, i.e. a halogen containing substance which can be split up into radicals by the recording beams, can be converted into a sufficiently stable colored form. In this material, it is not possible to exclude the possibility that, as a result of sensitivity to heat or prolonged storage, recyclisation may take place so that the colored hydroxy-arylvinylpyrylium salts revert to the colorless spiropyran form due to the elimination of HX.

Recording materials containing chromogenic substances which respond to a change in pH have been disclosed in German Offenlegungsschrift No. 1,549,101 and Dutch Pat. Specification No. 6,601,139, among others. In these materials, the photochemically reactive substances added to the layer are degraded by the action of radiation and the degradation products cause a change in pH either directly or by a reaction with other components of the recording material, for example by the formation of "HX". The chromogenic substances mentioned in the aforesaid documents have, however, the disadvantages of being fairly complicated to prepare and difficult to handle.

It is therefore an object of this invention to provide a radiation sensitive recording material which in addition to a radiation sensitive HX donor and a layer forming substance, contains a chromogenic substance the colored form of which cannot spontaneously revert to the colorless form under normal external conditions and which, moreover, is simple to prepare.

According to the invention, this problem is solved by the fact that the chromogenic substance is an arylvinylpyran or arylvinylthiopyran compound of the following general formula

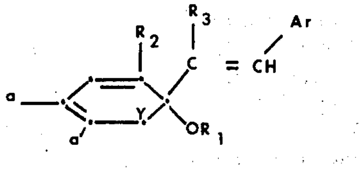

Ar represents a substituted or unsubstituted aryl group such as phenyl or naphthyl;

both a's taken together represent a group necessary for completing a substituted or unsubstituted aryl group condensed to the pyran or thiopyran ring such as a condensed benzo or naphtho ring;

Y represents oxygen or sulfur;

$R_1$ represents hydrogen or an alkyl, alkenyl or substituted or unsubstituted aryl group $R_2$ and $R_3$ are the same or different and represent each hydrogen, a saturated or unsaturated linear or branched alkyl group or a substituted or unsubstituted phenyl group; or $R_2$ and $R_3$ both taken together represent a substituted or unsubstituted alkylen bridge.

The course of the reaction which is brought about by the action of high energy radiation in a radiation sensitive recording material of the composition described above may in principle be described as follows: HX(hydrogen halide) is produced from the HX donor by the absorbed radiation and reacts with the chromogenic substance as follows:

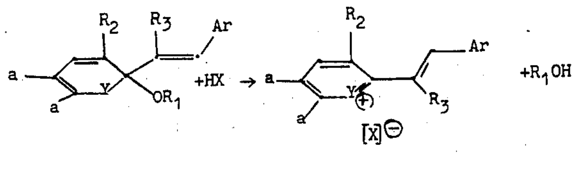

wherein Ar, a, Y, $R_1$, $R_2$ and $R_3$ are as defined above and X represents a halogen atom released from the HX donor, preferably a chlorine or bromine atom; $[X]^-$ consequently represents the corresponding halide.

According to this reaction scheme, the HX produced by the action of radiation separates a functional group $OR_1$ from the arylvinylpyran or arylvinylthiopyran compounds which are thereby converted into the corresponding arylvinylpyrilium or thiopyrylium salts. The consequence of the removal of a whole functional group is that a reaction in the opposite direction, i.e. conversion of the colored form into the colorless form, is no longer possible. Recording materials which are obtained in this way are then distinguished by exceptionally high long term stability of the colored form and are particularly suitable for irreversible data recording.

Compared with recording materials containing spiropyrans, these recording materials which contain the chromogenic substance according to the invention are more sensitive to the radiation used for recording. The chromogenic compounds of the present invention may be easily obtained for example by the following procedure. A suitable pyrylium or thiopyrylium perchlorate having at the carbon atom adjacent to the ring oxygen or ring sulfur atom a reactive group such as an alkyl, preferably methyl, or a methyl group, is reacted with an aromatic aldehyde such as benzaldehyde or naphthaldehyde. The reaction is preferably carried out in the presence of an acid condensing agent such as a lower aliphatic carboxylic acid, f.e. acetic acid, which also may act as solvent for the condensing reaction. The resulting 2-arylvinyl pyrylium or thiopyrylium perchlorate is subsequently reacted with an alkali metal phenolate or alkylate in a suitable alkyl alcohole solution; in the case of the reaction with alkylate preferably that alkyl alcohol is chosen as solvent from which the alkylate was prepared. As an example the 3-[$\alpha$-phenyl-$\beta$-(1-naphthyl)-vinyl]-3-phenoxy-3 H - naphtho[2,1-b]pyran mentioned hereinafter in the Example has been prepared by first condensing 3-benzyl-naphtho[2,1-b]pyrylium perchlorate with 1-naphthaldehyde in hot acetic acid solution; the condensation product is subsequently reacted in methanol with sodium phenolate to form the desired chromogenic compound. The recording material is formed by dissolving the compounds capable of color change and the HX donor compounds in a layer forming substance. The layer forming substances used may be polymers which may be prepared before or during preparation of the layer.

The following are examples of such layer forming substances and their starting materials:

a. Higher molecular weight polyethylene glycols;

b. Polyvinyl esters and their copolymers, e.g., polyvinyl acetate or vinyl acetate acrylate copolymer c. polyvinyl chloride and its copolymers, e.g., polyvinyl chloride or vinyl chloridevinylacetate copolymer d. polyvinylidene chloride and its copolymers, e.g., polyvinylidene chloride or vinylidene chloride/acrylonitrile copolymer, vinylidene chloride/vinyl acetate copolymer or vinylidene chloride/vinyl chloride copolymer (Saran)

e. polystyrene;

f. cellulose esters and their copolymers, e.g., cellulose acetate butyral or cellulose succinate;

g. polymethacrylate and polyacrylates and their copolymers;

h. addition polymerisable compounds such as pentaerythritol tetramethacrylate, butane-1,2,4-triol trimethacrylate, propane-1,3-diol diacrylate, glycerol triacrylate or the bisacrylates and bismethacrylates of polyethylene glycols;

i. nitrogen containing compounds which have ethylenically unsaturated groups such as diethylene-trismethacrylamide, methylene-bis-methacrylamide, N-vinylcarbazole, methylenebis-acrylamide, N,N-bis-(β-methacryloxyethyl)-acrylamide, and ethylene glycol-bis-[N-vinyl-carbamic acid ester];

j. polyvinylacetals such as polyvinylbutyral or polyvinylformal or copolymers of vinyl acetals such as vinyl acetal/chloroacetal.

The monomers used as starting materials may also themselves be polymerised under suitable conditions.

Suitable substances which are decomposed by the action of light to produce hydrohalide (HX) and thereby cause a change in pH and which in the context of this application are called HX donors are, in particular, halogen-containing organic compounds. The following are given as examples:

Tetrabromomethane,
α,α,α',α'-tetrabromo-o-xylene,
α,α'-hexachloro-m-xylene,
α,α'-hexachloro-p-xylene,
α,α,α-tribromo-tert.-butylalcohol,
chloroform
tribromoethanol,
bromoform,
hexachloroacetone,
2,4,4,4-tetrabromobutanol-1,
1,1,1,3-tetrabromo-3-phenylpropane,
1,1,2,2-tetrabromoethane,
hexachlorocyclopentadiene,
hexachloro-1,3-butadiene.

Some HX donors respond only to comparatively high energy radiation, e.g., shortwave UV light. In order that the types of recording radiation nowadays available such as laser beams which have a sufficiently high intensity at a wavelength in the range of from 325 to 400 nm may also be suitable for these substances, it is advisable to add sensitizing substances to the recording storage layer, for example benzophenone, diphenylamine or 2-acetyl-naphthalene.

These sensitizers are generally substances which are stimulated by longwave radiation to enter into a triplet state which, by virtue of its relatively long life, can transmit its energy by impact to the HX donor molecules to effect decomposition of the molecules.

Lastly, two examples of storage layers according to the invention are given below:

EXAMPLES a) 1 g of 3-[α-phenyl-β-(1-naphthyl-vinyl]-3-phenoxy-3 H-naphtho-[2,1-b]pyran and 5 g of α,α,α-tribomoethanol were dissolved in 100 ml of partly polymerised methylmethacrylate and polymerisation of the layer prepared from this solution was then completed by heating to 60°C for 24 hours.

b. 1 g of 2-[β-n-amylstyryl]-2-methoxy-2 H-benzo (1)-thiopyran and 5 g of α,α,α,-tribromoethanol were dissolved in 100 ml of dioxane and the solution was mixed with a solution of 20 g of polyvinyl acetate in 100 ml of methanol in the proportion of 3 : 1. A clear, transparent layer was obtained after evaporation of the solvent.

We claim:

1. Radiation sensitive recording material comprising a sheet comprised of a radiation sensitive organic halogen compound capable of producing hydrohalide by the action of ultraviolet light and an organic chromogenic compound capable of changing its color by reaction with hydrohalide and a layer forming substance containing a polymer for forming said organic halogen compound and said organic chromogenic compound in a layer wherein the improvement comprises the chromogenic compound is an arylvinylpyran or arylvinylthiopyran of the formula

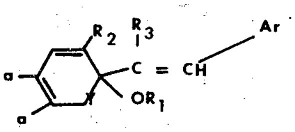

wherein

Ar represents a phenyl or naphthyl group;

both a's taken together represent a group necessary for completing an aryl group condensed to the pyran or thiopyran ring;

Y represents oxygen or sulfur $R_1$ represents hydrogen, alkyl, alkenyl or aryl $R_2$ and $R_3$ are the same or different and represent each hydrogen, alkyl, phenyl or both together an alkylene bridge.

2. A material as claimed in claim 1, wherein the chromogenic compound is 3-[α-phenyl-β-(1-naphthyl)-vinyl]-3-phenoxy-3 H-naphtho [2,1-b]pyran.

3. A material as claimed in claim 1 wherein the chromogenic compound is 2-[α-n-amylstyryl]-2-methoxy-2 H-benzo-(1) thiopyran.

4. A material as claimed in claim 1, wherein the radiation sensitive layer contains α,α,α-tribromoethanol.

5. Radiation sensitive recording material comprising a sheet comprised of a radiation sensitive organic halogen compound capable of producing hydrohalide by the action of ultraviolet light and an organic chromogenic compound capable of changing its color by reaction with hydrohalide, a polymeric layer forming substance containing a polymer for forming a layer with the organic halogen compound and said organic chromogenic compound wherein the improvement comprises the chromogenic compound is an arylvinylpyran or arylvinylthiopyran of the formula

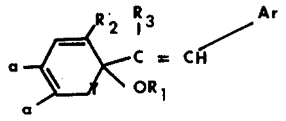

wherein

Ar represents phenyl or naphthyl;

both a's taken together represent a group necessary for completing an aryl group condensed to the pyran or thiopyran ring;

Y represents oxygen or sulfur $R_1$ represents hydrogen, alkyl, alkenyl or aryl $R_2$ and $R_3$ are the same or different and represent each hydrogen, alkyl, phenyl, or both together an alkylene bridge.

6. Radiation sensitive recording material comprising a sheet comprised of a radiation sensitive organic halogen compound capable of producing hydrohalide by the action of long wave light and an organic chromogenic compound capable of changing its color by reaction with hydrohalide and a layer forming substance containing a polymer for forming said organic halogen compound and said organic chromogenic compound in a layer wherein the improvement comprises the chromogenic compound is an arylvinylpyran or arylvinylthiopyran of the formula

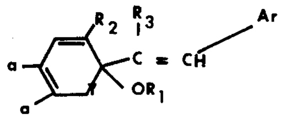

wherein

Ar represents a phenyl or naphthyl group;

both a's taken together represent a group necessary for completing an aryl group condensed to the pyran or thiopyran ring;

Y represents oxygen or sulfur $R_1$ represents hydrogen, alkyl, alkenyl or aryl $R_2$ and $R_3$ are the same or different and represent each hydrogen, alkyl, phenyl, or both together an alkylene bridge, and the layer contains a sensitizing substance for long wave light.

7. A material containing a chromogenic compound as claimed in claim 1 wherein

Ar is phenyl or naphthyl, both a's taken together represent a group necessary for completing a condensed benzo or naphtho ring, $R_1$ is phenyl or lower alkyl, $R_2$ is hydrogen, phenyl or alkyl, $R_3$ is hydrogen, phenyl or lower alkyl, and $R_2$ and $R_3$ both together form a lower alkylene bridge.

* * * * *

UNITED STATES PATENT AND TRADEMARK OFFICE

CERTIFICATE OF CORRECTION

PATENT NO. : 3,942,996

DATED : March 9, 1976

INVENTOR(S) : Arnold et al

It is certified that error appears in the above-identified patent and that said Letters Patent are hereby corrected as shown below:

On the front page, under [73] "Assignee: AGFA-Gevaert Aktiengesellschaft, Leverkusen, Germany" should read -- Assignee: LICENTIA Patent-Verwaltungs-GmbH, Frankfurt am Main, Germany --

Signed and Sealed this

Thirteenth Day of July 1976

[SEAL]

*Attest:*

RUTH C. MASON
*Attesting Officer*

C. MARSHALL DANN
*Commissioner of Patents and Trademarks*